(12) United States Patent
Ganjyal et al.

(10) Patent No.: US 7,989,592 B2
(45) Date of Patent: *Aug. 2, 2011

(54) PROCESS FOR PREPARING HYBRID PROTEINS

(75) Inventors: Girish M. Ganjyal, Atchison, KS (US); Clodualdo C. Maningat, Platte City, MO (US); Sukh Bassi, Atchison, KS (US)

(73) Assignee: MGP Ingredients, Inc., Atchison, KS (US)

( * ) Notice: Subject to any disclaimer, the term of this patent is extended or adjusted under 35 U.S.C. 154(b) by 872 days.

This patent is subject to a terminal disclaimer.

(21) Appl. No.: 11/777,176

(22) Filed: Jul. 12, 2007

(65) Prior Publication Data

US 2008/0021203 A1 Jan. 24, 2008

Related U.S. Application Data

(63) Continuation-in-part of application No. 11/459,198, filed on Jul. 21, 2006.

(51) Int. Cl.
*C07K 14/00* (2006.01)

(52) U.S. Cl. .......................................... 530/350; 514/2

(58) Field of Classification Search .................. None
See application file for complete search history.

(56) References Cited

U.S. PATENT DOCUMENTS

| | | | |
|---|---|---|---|
| 3,754,926 A | 8/1973 | Strommer et al. | |
| 3,965,268 A | 6/1976 | Stocker et al. | |
| 4,036,996 A | 7/1977 | Chandler et al. | |
| 4,038,431 A | 7/1977 | Hildebolt | |
| 4,038,432 A | 7/1977 | Hildebolt et al. | |
| 4,062,987 A | 12/1977 | Hildebolt | |
| 4,500,454 A | 2/1985 | Chang | |
| 4,650,856 A | 3/1987 | Yagi et al. | |
| 5,068,117 A | 11/1991 | McCabe | |
| 5,100,679 A | 3/1992 | Delrue | |
| 7,534,459 B2 * | 5/2009 | Chinnaswamy et al. | 426/511 |
| 2004/0086613 A1 | 5/2004 | Chinnaswamy et al. | |
| 2008/0020125 A1 * | 1/2008 | Ganjyal et al. | 426/657 |

FOREIGN PATENT DOCUMENTS

| | | |
|---|---|---|
| EP | 782825 | 7/1997 |
| JP | 356021568 | 2/1981 |
| JP | 360030645 | 2/1985 |
| JP | 361227739 | 10/1986 |
| JP | 362146569 | 6/1987 |

* cited by examiner

*Primary Examiner* — Anand Desai
(74) *Attorney, Agent, or Firm* — Hovey Williams LLP

(57) ABSTRACT

Hydrothermal processes are provided for preparing hybrid proteins containing altered SS/SH bonds, thereby yielding hybrid proteins having enhanced functional and/or nutritional properties. The processes involve initial homogenization of a protein-containing slurry containing at least two proteins, followed by high pressure steam treatment in a jet cooker (16) or similar device in order to heat shock and thereby alter the conformation of some of the proteins, followed by a holding period to allow the proteins to reform, whereupon the proteins are cooled. Plant and animal proteins may be processed, and the starting slurry can be pH-modified and/or supplemented with one or more additional ingredients (e.g., salts, phosphates, fatty acids, polysaccharides, alcohols, aromatic compounds). The hybrid proteins are useful as food ingredients (e.g., solubility, wetability, dispersibility, foiling, emulsification, viscosity, gelatinosa or thickening agents).

28 Claims, 6 Drawing Sheets

PROCESS FOR PREPARING HYBRID PROTEINS

RELATED APPLICATION

This application is a continuation-in-part of U.S. patent application Ser. No. 11/459,198, filed Jul. 21, 2006, entitled PROCESS FOR PREPARING HYBRID PROTEINS, which is hereby incorporated by reference in its entirety.

BACKGROUND OF THE INVENTION

1. Field of the Invention

The present invention is broadly concerned with processes for the production of hybrid proteins formed by the interprotein and/or intraprotein rearrangement of SS/SH bonds in a plurality of different starting proteins, in order to obtain hybrid proteins having desired functional characteristics. More particularly, the invention is concerned with such processes and the resultant hybrid proteins wherein an aqueous, protein-containing slurry comprising at least two different proteins is initially homogenized and then hydrothermally treated using high pressure steam in a jet cooker or similar device in order to cause an interaction between steam and the starting proteins, thereby altering the conformation of at least some of the proteins. The treated slurry is then held and cooled to cause the formation of hybrid proteins, which are recovered by spray drying or any other moisture removal technique.

2. Description of the Prior Art

Proteins are essentially composed of linear chains of amino acid residues linked together by peptide bonds which join the nitrogen atoms of amino groups to the carbon atoms of preceding carboxyl groups. All amino acids have identical backbone structure and differ only in their side chains. The physiochemical properties of amino acid residue side chains and the sequence of these residues are the dominant factors in determining the structure and function of proteins. Protein molecules also vary widely in size, e.g., enzymes may vary in size from about 13 kDa up to several thousand kDa.

The structure of proteins is recognized at four distinct levels of importance. The most basic level is the primary structure, i.e., the sequence of amino acid residues in the chain. The secondary structure of proteins relates to the formation of amino acid residues which are relatively close to one another in the chain. Three conformations are known: α-helix, β-pleated sheet and a periodic (also known as random coil). The tertiary structure of proteins refers to the spatial structure thereof, resulting from hydrophobic and electrostatic forces, and disulfide bridges between aliphatic and aromatic side chains of the protein. Hydrophobic interactions are the major forces responsible for tertiary structure. The fourth and last protein structure is quaternary structure. This essentially describes the nature of the assemblage of protein subunits to form a massive aggregated molecule.

The properties of food and proteinaceous feed ingredients may be placed in two categories, namely nutritional and functional properties. Functional properties are defined as those properties of a food or food ingredient that affect its utilization, or influence the behavior of the food or food system during processing, handling, storage, preparation and consumption. For a given protein to perform well in a food system, it should normally possess multiple functionalities. For example, egg white possesses multiple functionalities including foaming, emulsifying, heat setting, and binding/adhesion. The functional properties of any protein are basically related to its physiochemical and structural properties including size, shape, amino acid composition and sequence, net charge, charge distribution, hydrophobicity/hydrophilicity ratio, and the secondary, tertiary and quaternary structural arrangements.

Efforts have been made in the past to modify or rearrange proteins in order to alter the functional properties thereof. For example, European Patent No. 782825 describes a method of rendering whey protein more hydrophobic in order to improve its gelling properties. Commercially available whey protein concentrate was heated to 75° C. along with sodium or magnesium caseinate, giving the resultant protein an increase in hydrophobicity. Lasztity et al., *Narung*, 42:210 (1998) studied wheat germ protein systems modified with urea to disassociate quatemarystructures, β-mercaptoethanol to reduce SS bonds and aeration to reoxidize SH groups to SS bonds. This treatment altered the surface protein properties of the wheat germ protein.

The dissertation of Ballegu, *Effect of Hydrothermal Process on Functional Properties of Wheat Gluten Isolate* (2001), describes hydrothermal processing of wheat gluten isolate using a jet cooker. HPLC profiles of the recovered protein samples revealed polymerization of gliadin molecules through aggregation and/or crosslinking to give glutenin or glutenin-like molecule; the extent of polymerization was found to depend upon the process severity. The viscosity of the hydrothermally processed wheat gluten isolate was found to be higher than that of the control, regardless of processing conditions.

Other references include: Cosio et al., *J. Dairy Sci.*, 83:1933 (2000); Apichartsrangkoon, *Food Sci.*, 67:653 (2002); U.S. Pat. Nos. 4,038,431, 4,500,454, 3,754,926, 5,100,679, 5,068,117, 4,036,996, 3,965,268, 4,038,432, 4,062,987, and 4,650,856; and Japanese Patents Nos. 356021568, 362146659, 361227739 and 360030645.

Generally speaking, the prior art teaches that single proteins or mixtures may be modified by processes using chemical modifiers together with heat and pressure (e.g., extrusion or steaming processes). However, such techniques can profoundly alter the functional properties thereof, sometimes in disadvantageous ways.

SUMMARY OF THE INVENTION

The present invention is directed to the formation of hybrid proteins from, plural different starting proteins. Broadly speaking, the method of the invention involves providing an aqueous, protein-containing slurry including at least two different proteins therein. The slurry is first homogenized, preferably using conventional food homogenizing equipment with or without pH modification. This homogenized slurry is then introduced together with high pressure steam into a pressurized injection zone, where the proteins are treated under conditions of heat and pressure and for a time sufficient to alter the conformation of at least some of the proteins. Following such hydrothermal treating, the treated slurry is passed through a holding tube and cooled.

Preferably, the aqueous starting slurry should have a solids content of no more than about 50% by weight, preferably up to about 35% by weight. The initial homogenization of the protein slurry is designed to achieve a unifonn and well-mixed product. In the homogenization process, it is not necessary, and may be undesirable, to use high temperature conditions as in the case of homogenization of milk. Rather, the preferred process is carried out essentially at ambient temperature using a homo mixer normally employed in the food industry. Are homogenization speed is variable depending upon the solids content of the initial slurry, and the types of proteins being processed. In some instances, a processing speed of from about 20-60 Hz, and more preferably about 30-50 Hz, give good results.

In many cases it is desired to adjust the pH of the initial slurry prior to or during homogenization. The variety of different pH adjusting agents can be used for this purpose so long as an essentially uniform slurry is obtained.

After homogenization, with or without pH adjustment, the slurry is treated in a pressurized injection zone (e.g., a jet cooker) to obtain a direct, high pressure steam-induced interaction of the starting proteins. Conditions within the pressurized injection zone should be selected so that a temperature of from about 10-350° F. (more preferably from about 100-350° F.) and a pressure of from about 10-150 psi are maintained. The residence time of the slurry within the injection zone should be on the order of 1 second to 2½ minutes. After high pressure steam treatment, the product is preferably held for a period of from about 15 seconds-1 minute and thereafter cooled. The cooling step is preferably carried out over a short period of time (about 10-60 seconds) to achieve a temperature of from about 50-150° F.; cooling may be accomplished by exposure to the atmosphere and/or by supplemental cooling hereafter, the product may be dried by spray drying or any other convenient technique. The dried hybrid protein products should have a moisture content of from about 3-10% by weight, wet basis.

It is believed that the direct interaction between high pressure steam and the starting proteins serves to "open up" or otherwise change the conformation of the proteins. Thereafter, and especially during the holding step and somewhat during the cooling step, the proteins rearrange to form the desirable hybrid proteins of the invention.

Hybrid proteins in accordance with the invention find particular utility in food systems, serving as solubility, wetability, dispersibility, foaming, emulsification, viscosity, gelation or thickening agents, depending upon the specific properties of the hybrid proteins. The processes of the invention can be tailored to enhance particular properties of the starting proteins.

DETAILED DESCRIPTION OF THE PREFERRED EMBODIMENT

Figure 1:
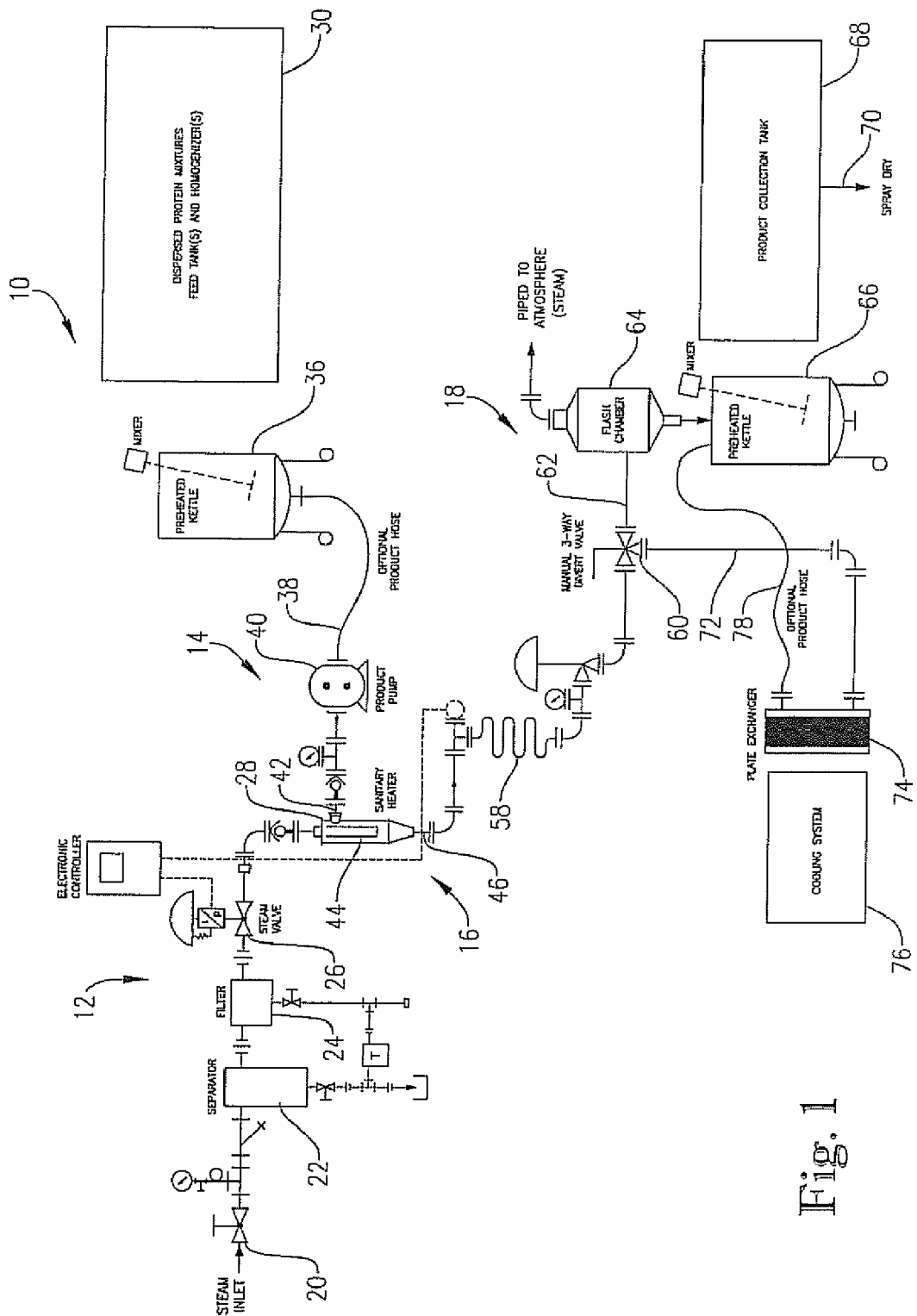
FIG. 1 is a schematic illustration of a suitable processing apparatus in accordance with the invention.

A suitable apparatus 10 for carrying out the process of the invention is schematically illustrated in FIG. 1. Broadly speaking, the apparatus 10 includes a steam injection assembly 12, a slurry preparation and injection assembly 14, a jet cooker 16, and a recovery assembly 18.

The steam assembly 10 includes an inlet valve 20 with an inline separator 22 and filter 24 leading to electronically controlled valve 26, the output of the latter leading to the steam inlet 28 of jet cooker 16. The assembly 14 includes one or more slurry feed tank(s) 30 preferably equipped with homogenizers or homomixers (e.g., AZ&S—MS Series homomixers) together with a preheat tank 36; the latter has product line 38 directed to product pump 40. The outlet of the pump 40 leads to the slurry inlet 42 of cooker 16.

Figure 2:
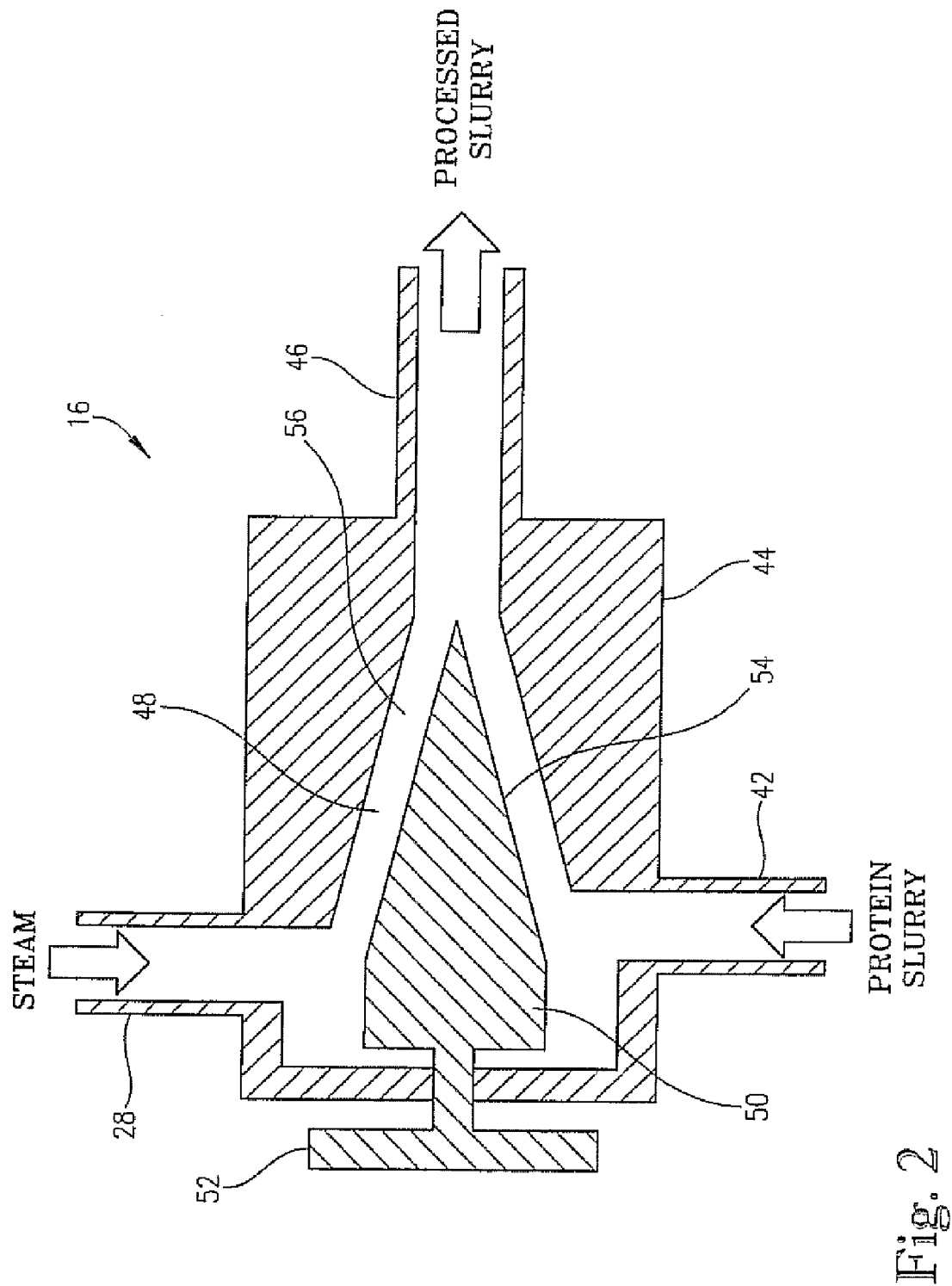
FIG. 2 is a schematic representation of a preferred type of jet cooker used in the process of the invention.

The jet cooker 16 is further illustrated in FIG. 2 and includes a main body 44 having steam inlet 28 and slurry inlet 42 coupled thereto, as well as a processed slurry output line 46. Internally, the body 44 presents a converging passageway 48 leading to the output line 46. An adjustable valve member 50 is disposed within passageway 48 and is axially shiftable therein by means of rotatable adjustment wheel 52. It will be observed that the member 50 presents a conical wall 54 which generally mates with the adjacent defining wall surfaces of the body 44. As will be readily appreciated, the body 50 may be adjusted to provide a greater or lesser clearance between the conical wall 54 and the adjacent main body wall surfaces. This in effect creates a restricted pressurized injection zone 56 within the confines of the body 44. It will also be appreciated that the design of the jet cooker can be varied in order to achieve the ultimate goal, i.e., a direct interaction of steam and slurry under elevated pressures.

The recovery assembly 18 includes a product conveying line 58 (which also serves as a holding zone) equipped with appropriate valving, and leading to a three-way diversion valve 60. One output leg 62 of the valve 60 leads to flash chamber 64 permitting flash of steam to the atmosphere with consequent cooling. The slurry output from chamber 64 is directed to a heated kettle 66 coupled to product collection tank 68. The recovered slurry within tank 68 is then passed via line 70 to a conventional spray dryer. The opposite leg 72 from valve 66 passes to plate-type heat exchanger 74, operated using conventional cooling system 76. The output 78 from exchanger 74 may pass to kettle 66 or directly to tank 68. As will be readily appreciated, the assembly 18 thus allows the user the option of cooling solely by exposure to ambient atmosphere, or with supplemental cooling via exchanger 74 prior to drying.

In use, the apparatus 10 functions to treat protein slurries so that the entire process is able to create hybrid proteins having desired functional characteristics. As explained above, in broad terms the method of the invention involves providing an aqueous, protein-containing slurry made up of at least two different proteins; this slurry is homogenized and is introduced along with steam into a pressurized injection zone, and the proteins are treated therein under conditions to alter the conformation of at least some of the proteins. Thereafter, the treated slurry is cooled and combined hybrid proteins are recovered.

The incoming slurry can have a solids content of up to about 50% by weight, but more preferably it is dilute and should have a solids content of up to about 35% by weight and still more preferably from about 0.5-20% by weight. The total protein content of the starting slurry is generally in the range of from about 3.5-45% by weight, and more preferably from about 5-45% by weight.

A wide variety of proteins may be used in the invention, but advantageously the selected proteins should themselves be concentrated, i.e., the protein-bearing materials used should have a protein content of at least about 65% by weight, more preferably from about 70-90% by weight. In terms of soy protein for example, either soy concentrate (typically around 75% by weight soy protein) or soy isolate (typically about 90% by weight soy protein) should be used in lieu of lower protein concentration products such as soy flour or meal. Virtually any combination of proteins maybe employed, i.e., the proteins maybe selected from the group consisting of plant and animal proteins. Exemplary plant proteins are selected from the group consisting of soy, wheat, oat, rice, peanut, pea, cotton seed, corn, sorghum, fruits, and mixtures thereof, whereas, suitable animal proteins are selected from the group consisting of beef, poultry, pork, milk, whey, eggs, and mixtures thereof; single cell proteins are also usable. It should also be understood that the starting proteins may be native proteins or may be modified by any known means such as chemical, enzymatic, or thermo-mechanical processes. To give but one example, deamidated gluten may be used in the invention along with another protein such as corn zein. Single cell proteins may also be used, such as those obtained from processes in which bacteria, yeasts, or other fungi or algae are cultivated. Finally, in many cases proteins of different species are employed, e.g., soy and wheat proteins, rather than different, intra-species proteins such as different wheat-derived proteins.

The combined protein products of the invention can be made up using essentially any number of different proteins, such as wheat and soy, soy and whey, or wheat, soy and whey. Moreover, the concentration levels of individual proteins can also be varied over wide limits in order to obtain desired functional and nutritional properties.

As noted above, it is often desirable to alter the pH of the starting protein slurry to a ph which will maximize the water solubility of the starting proteins; such adjustment may be made prior to, during, or after homogenization. In practice, acidic pH levels of from about 2-6.8, and more preferably from about 3.0-5.0 are used. Basic pH levels should range from about 7.5-10, and more preferably from about 8-9.5. When operating at basic pH levels, care should be taken to avoid pHs which will cause side reactions leading to toxic substances or compounds, inasmuch as the process involves high temperatures and pressures.

If desired, the slurry may also be supplemented with additional ingredients designed to achieve further or different protein hybridizations or interactions. Thus, the slurry may include one or more additional ingredients such as those selected from the group consisting of sulfur-containing compounds such as bisulfites or $SO_2$ (20-200 ppm), oxygen (20-200 ppm), alkali metal and/or alkaline earth metal salts (e.g., chlorides, bromides, or carbonates, about 0.01-2% by weight), phosphates (poly and pyrophosphates, 0.01-2% by weight), C12-C22 fatty acids (0.01-2% by weight), polysaccharides (e.g., xanthan gum, 0.1-2% by weight), C1-C4 aliphatic alcohols or aromatic compounds (e.g., toluene, 0.1-10% by weight). The foregoing additional ingredient levels of use are approximate, and are based upon the total weight of protein in the slurry taken as 100% by weight.

The processing conditions within jet cooker 16 are selected so as to alter the conformation of at least some of the proteins within the starting slurry. Thus, temperature conditions of from about 100-350° F. should be maintained within zone 56, more preferably from about 225-350° F. Pressure conditions in the zone 56 are typically maintained at a level of from about 10-150 psi, more preferably from about 60-135 psi. Retention time within the zone 56 should be up to about 2½ minutes, preferably from about 1 second-2½ minutes, and more preferably from about 1-125 seconds.

The treated slurry exiting jet cooker 16 via output line 46 is normally cooled (preferably by natural convection) in order to assist in the formation of hybrid proteins, and the conveying/holding line 58 is employed for this purpose. It is preferred that the treated slurry be cooled to a temperature of from about 50-150° F., and more preferably from about 75-125° F. Moreover, such cooling should be done over a relatively short period of time usually from about 10-60 seconds and more preferably from about 15-40 seconds. In some instances sufficient cooling may be obtained simply by flashing the product to the atmosphere The treated slurry, whether cooled or not, is advantageously dried to permit recovery of the hybrid proteins. A variety of techniques may be used for drying, but most efficient drying is carried out in a conventional spray dryer. The moisture content of the final recovered hybrid proteins should be from about 3-10% by weight, or more preferably from about 4-7% by weight, wet basis.

The methods of the invention may be carried out using a variety of different equipment and process schemes. For example, the tank(s) 30 illustrated in FIG. 1, may each be equipped with a homo mixer or homogenizer and include structure for addition of acid or base for pH adjustment. Optionally, reduced moisture protein slurries may be homogenized in small tanks, with pH adjustment, followed by transfer into the tank(s) 30, with the remaining water being added at this point.

If desired, in-line homogenizers (e.g., AZ&S Model LDI homogenizers) maybe used in lieu of the tank homomixers or homogenizers. This option would typically add more cost, but would be an effective homogenization technique. In such a system, the pH of the slurries would typically be adjusted prior to in-line homogenization, which may require post-treatment pH adjustment.

While the use of a jet cooker 16 is preferred, alternate devices are usable. To give one example, a cyclone having an internal, apertured steam sparger can be employed. In such a device, the homogenized slurry is fed tangentially into the cyclone, whereas the steam sparger is located vertically within the cyclone. The aperture size of the sparger can be altered to obtain higher steam pressures and consequent different degrees of protein modification. Of course, in this type of sparger device, the proteins are subjected to conditions of heat and pressure in order to alter the conformation thereof.

The serpentine holding tube 58 can be of various lengths to achieve desired protein rearrangement and initial cooling. The tube 58 can be directly coupled with heat exchange equipment or may be fed to a cyclone separator for direct collection of product.

Figure 3:
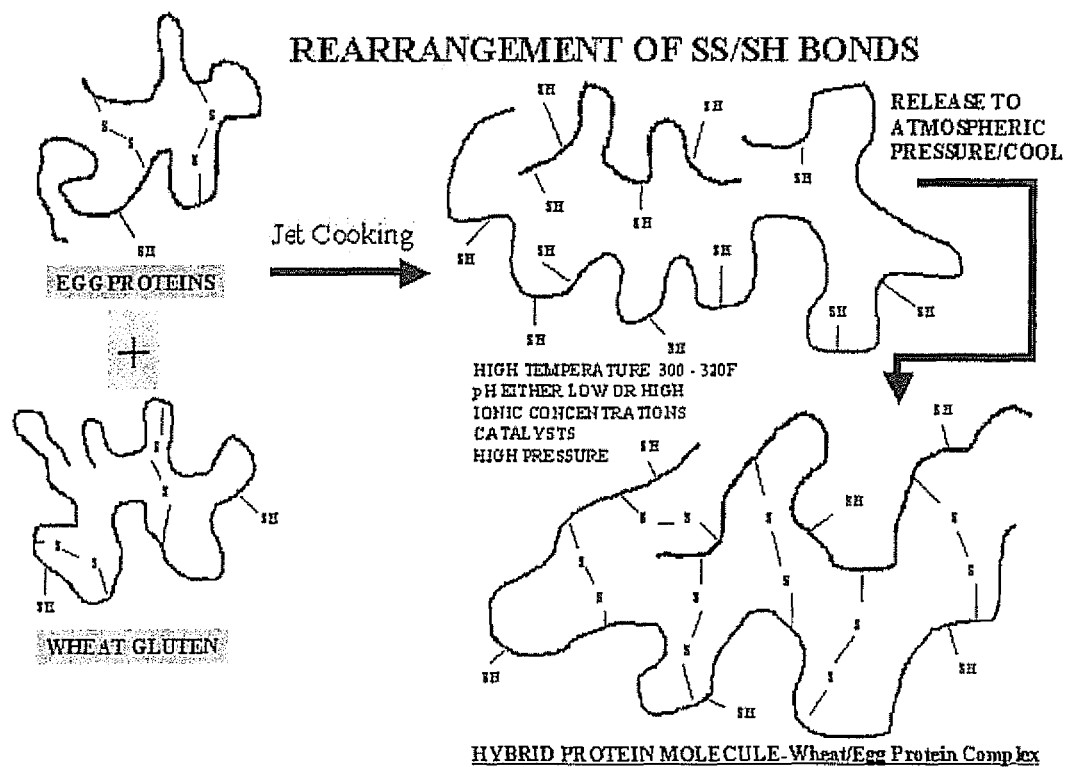
FIG. 3 is a schematic representation illustrating a mechanism for the production of hybrid proteins using the process of the invention.
Figure 4:
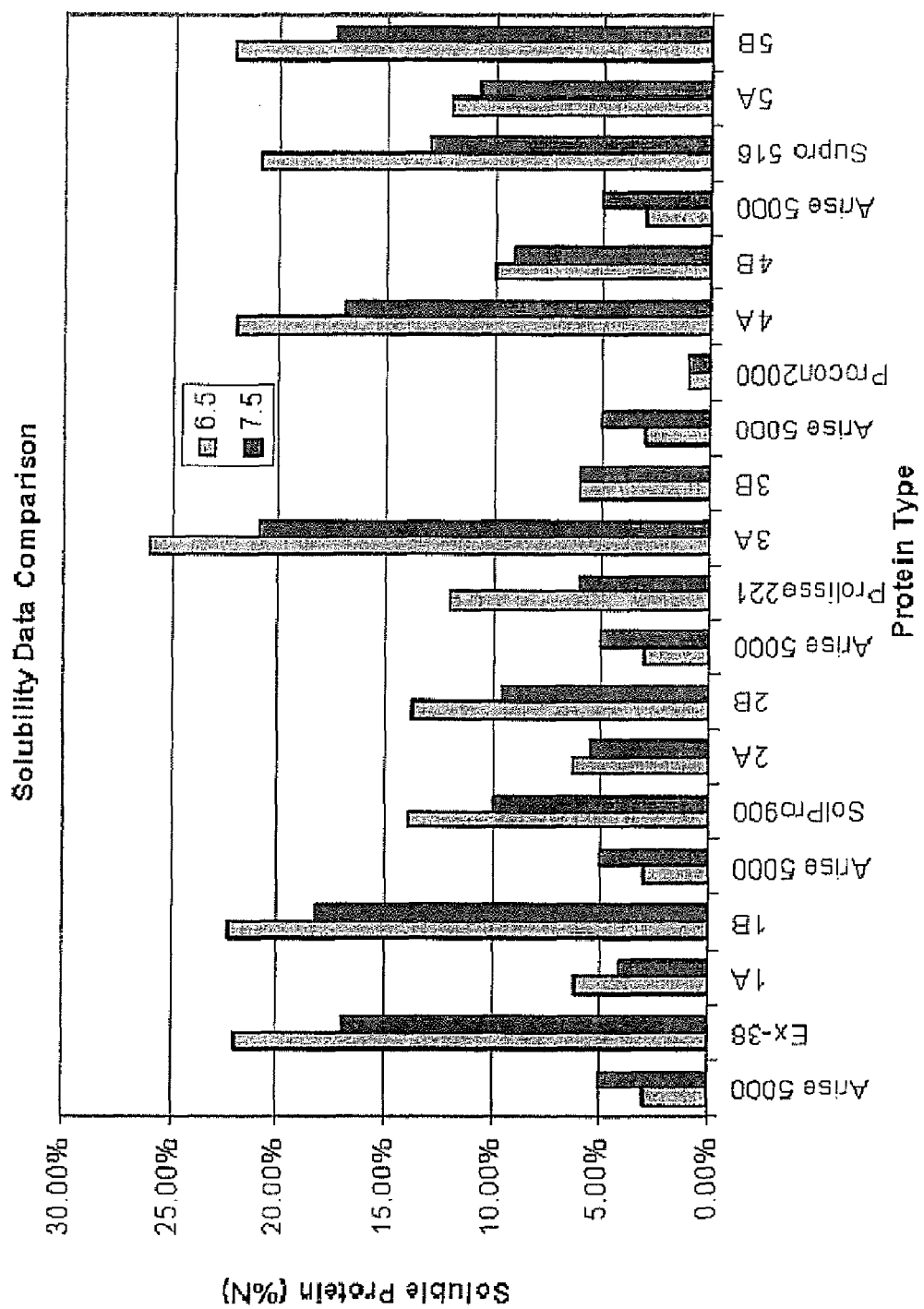
FIG. 4 is a bar graph illustrating a series of tests described in Examples 1 and 2, wherein various mixtures of wheat protein isolate and soy protein isolate were processed in accordance with the invention, and tested for soluble protein.
Figure 5:
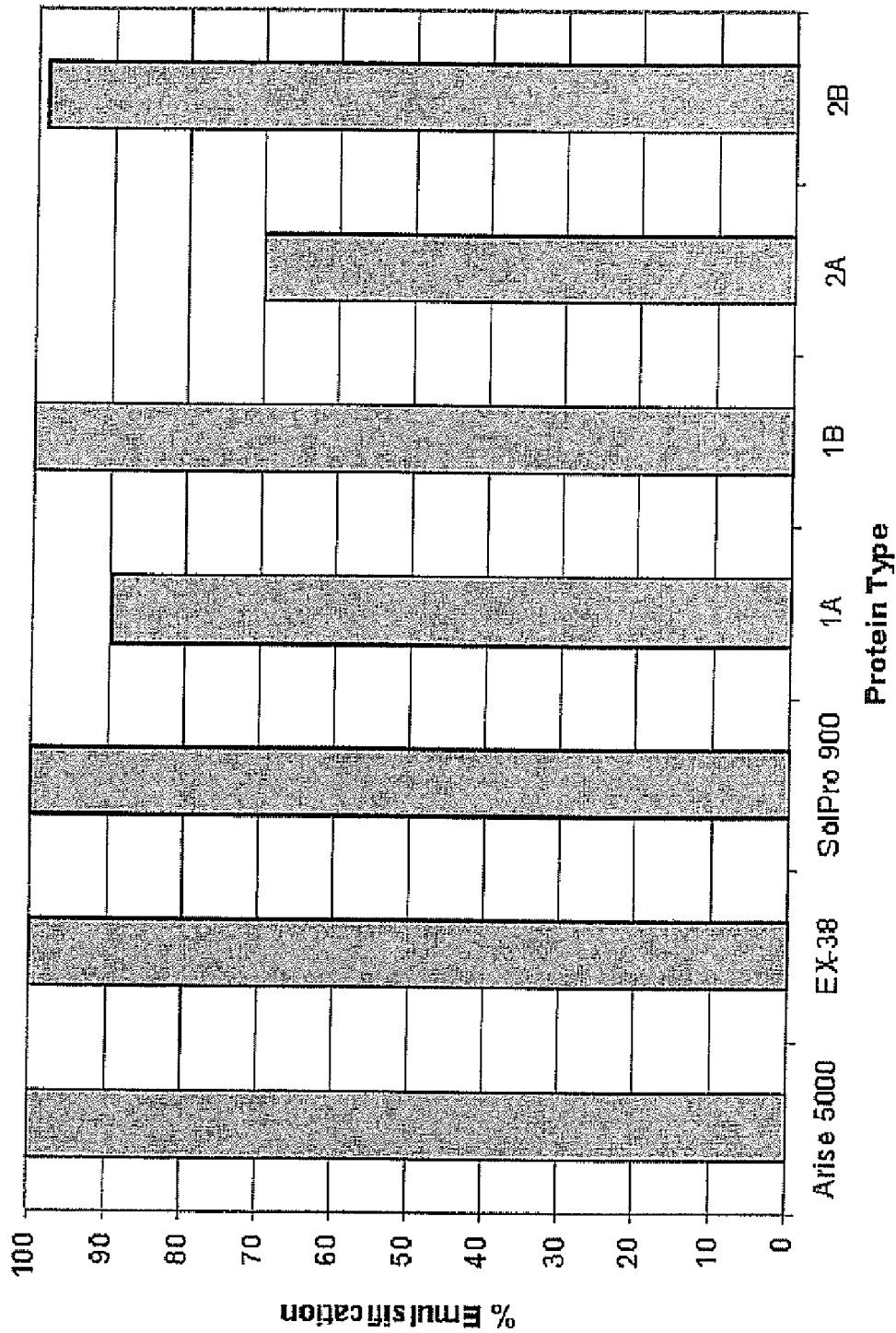
FIG. 5 is a bar graph illustrating emulsification properties of certain of the wheat protein isolate/soy protein isolate products described in Example 1.
Figure 6:
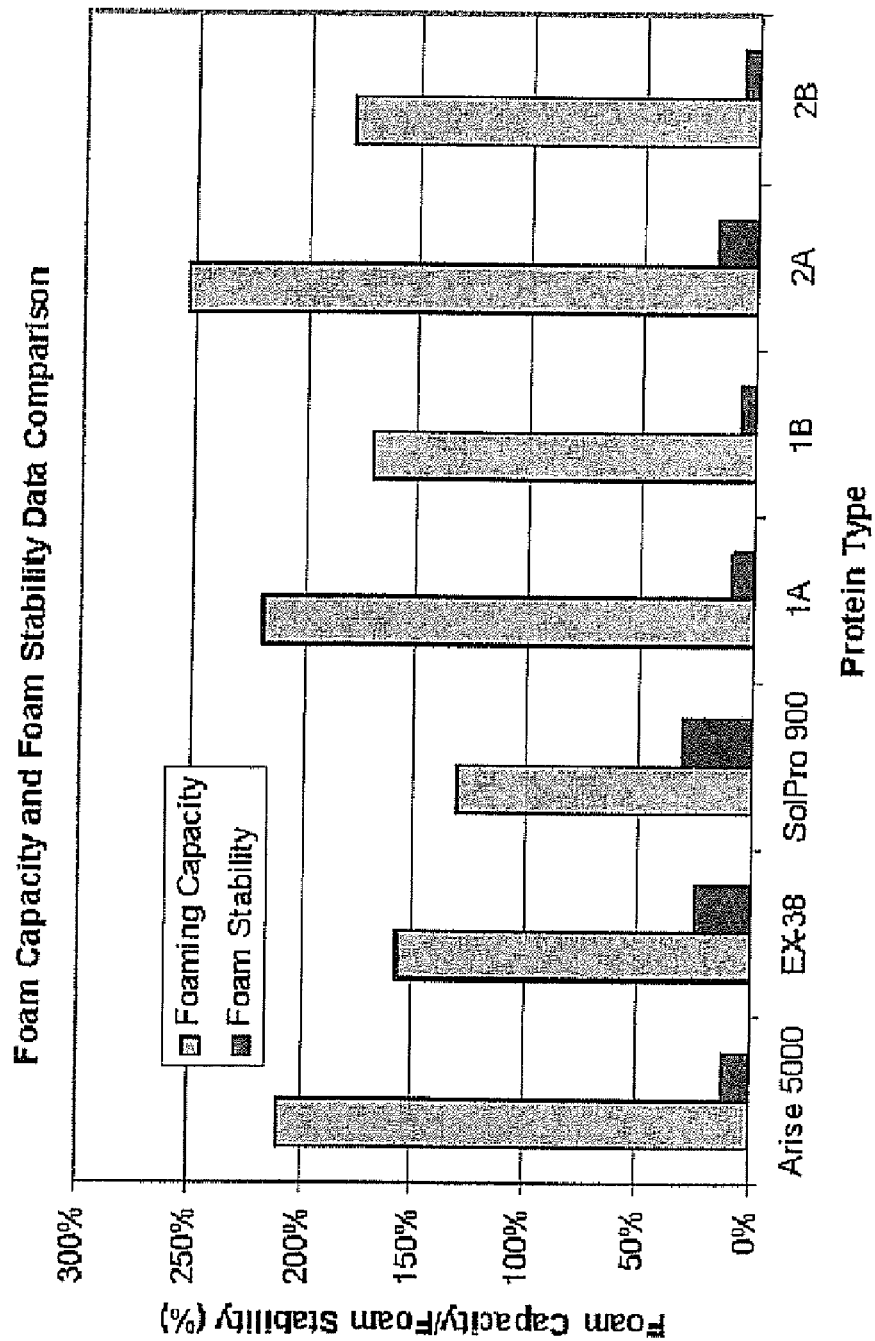
FIG. 6 is a bar graph comparing the foam capacity and foam stability of wheat protein isolate/soy protein isolate hybrid protein products of the invention as compared with individually processed wheat protein isolate.

Although not wishing to be bound by any theory, it is believed that hybrid proteins are formed in the process of the invention by the combination of heat shock effected in the jet cooker 16, followed by holding and cooling. FIG. 3 schematically illustrates an exemplary process wherein wheat gluten and egg proteins are co-processed in a jet cooker. In the jet cooker, the protein heat shock effectively uncoils or "opens up" the starting proteins to alter the conformation thereof. Thereafter, upon release to atmospheric pressure with or without cooling, the heat shocked proteins reform by the rearrangement of SS/SH bonds. This SS/SH bond rearrangement may occur interprotein or intraprotein or both as shown in FIG. 3, so that the hybrid protein molecules are different from the starting proteins owing to changes in gross amino acid composition, and/or the quantity of disulfide bonds or thiol groups present. Thus, the hybrid proteins have different charge densities (domains), which correspondingly alters the hydrophobic and hydrophilic properties thereof. The overall hybrid protein hydrophobicity ad hydrophilicity, along with rearrangement of disulfide bonds therein, essentially decides the status of the secondary, tertiary and quaternary protein structures which in turn influences the functionality of the hybrid proteins in food systems for example. Moreover, these alterations in the hybrid proteins will impact upon their molecular surface related properties (solubility, wetability, dispersibility, foaming and emulsification), and hydrodynamic properties (viscosity, gelation, thickening).

The following examples set forth presently preferred techniques for the creation of the hybrid, combined proteins of the invention. It should be understood, however, that these examples are provided by way of illustration only, and nothing therein should be taken as a limitation upon the overall scope of the invention.

In the following examples, the hybrid protein products are tested for certain functional properties. The analytical techniques used to determine these properties are set forth below.

Emulsification Capacity:

Weigh 8 gm of the dry protein powder and put it in the blender jar. Weigh 100 ml of deionized water and 100 ml of corn oil and pour into the blender jar with the dry protein powder. Blend for 1 min on high setting. Pour 40 ml (Vt) of the blended mixture into a centrifuge tube and centrifuge at 4000 rpm for 5 min. Using syringe extract all the separated/clear water and record the water extracted (Vne). And emulsification capacity is calculated as:

% Emulsification Capacity (EC)=(Ve/Vt)*100 where, Vt=Initial volume
Vne=Non-emulsified fraction
Ve=Emulsified fraction=(Vt−Vne)

In the case of samples which fail to break the emulsion using 100 ml oil (i.e., the samples give 100% EC values), such samples are retested using increased quantities of oil in 25 ml increments, and the point when the emulsion broke is recorded. This is to determine the maximum EC.

Foaming Capacity

Weigh 8 gm of dry protein powder into a glass beaker. Add 100 ml of deionized water Place the beaker on a hot plate with no heat. Mix with magnet stirrer until no lumps remain. Pour 75 ml of the mixture (Vi) into blender jar and mix on high setting for 3 min. Pour all contents at once into a large measuring cylinder. Measure the total volume (Vt) in the cylinder and hold for 30 min. After the holding for 30 min, measure the water (Vo).

Foaming Capacity (Fc)=Vf/Vi
  Where, Vf=Foam Volume
  Vi=Initial Volume
Foam Stability (Fs)=(Vi−Vo)/Vi
  Where, Vf=Foam Volume
  Vi=Initial Volume
  and Vo=Left over liquid volume Gelling Test Weigh 2 gm of dry protein powder in a small mixer. Mix with 100 ml of deionized water. Mix until dissolved, but do not over-mix and try to avoid foaming. Transfer the sample into a small bottle with airtight cap. Repeat the above steps to produce samples by increasing the dry protein powder content in 2 gm increments, until the protein sample weight reaches 20 gm, or no further protein could be added. Steam cook all the samples at 185° F. for 1 hr. After cooking, immerse the sample bottles into ice-cold water for 10 min and refrigerate overnight. Check the samples to see if any have gelled. This is done by inverting the small bottles and observing for gelation. That is, if the sample does not move when inverted and stays tight to the bottom of the bottle, it is considered gelled. The gelled sample having the lowest quantity of dry protein powder therein is recorded as the gelling point.

Solubility

Total protein solubility is determined using a modified method described by Vani and Zayas (1995). Specifically, a protein solution (5% w/w in deionized water) is prepared from each protein source, divided into six portions and subsequently adjusted to pH 3.5, 4.5, 5.5, 6.5, 7.5, and/or 8.5 using 1.0 N NaOH or HCl. Samples are then centrifuged (Sorvall RC-5B, DuPont Instruments, Newtown, Conn.) at 12,000 g for 15 minutes. Supernatant liquid is analyzed for total solubility using an RFM automatic refractometer (Bellinghain & Stanley, Tunbridge Wells, UK) and nitrogen solubility using a FP-428 LECO Nitrogen Determinator (LECO Corp., St. Joseph, Mich.).

Example 1

In this example, wheat protein isolate (Arise 5000, MGP Ingredients, Inc.) and soy protein isolate (EX-38, Solae Company) were combined at a ratio of 50:50 on a w/w basis. Slurries were then made with a total solids content of 5% w/w. The mixtures were then homogenized using a Morehouse-Cowles model V-0-01 homogenizer at a speed of about 40-50 Hz until a uniform mixture was obtained. During the course of homogenization, the pH of the mixtures was adjusted to acidic (3-4.5) or basic (8-9.5) using either lactic acid or hydrochloric acid or sodium hydroxide. After homogenization, the mixtures were transferred to a tank and then processed in the jet cooker described above, at a temperature of 250° F. After jet-cooking, the processed mixtures were transferred to a holding tube for 25-35 seconds. After the holding period, the solutions were collected and then spray-dried to yield final dried hybrid protein powders. The moisture content of the final products ranged between 4-8% by weight.

It was observed that the emulsification capacity (EC) of the hybird protein changed significantly, as compared with the starting proteins. The Ex-38 protein by itself took about 112 ml oil to break the emulsion and Arise 5000 by itself took about 183 ml oil to break the emulsion, while the combined protein processed at basic pH took about 187 ml oil to break the emulsion. This clearly showed the enhanced emulsification capacity of the combined protein. In these experiments, the Arise 5000 was tested at acidic pH, while all other proteins were tested at neutral pH. Arise 5000 at neutral pH is not at all soluble and basically forms a gluten mass which does not emulsify.

Also, the solubility of the initial proteins and the combined proteins were tested. The N solubility (between pH 6.5 and 7.5) of the Arise 5000 was about 5% to 3% and that of EX-38 was 17% to 25%. And the values for combined proteins of the two processed at basic pH were between 18% to 22%. These results confirmed that the functional properties of the combined proteins changed significantly versus the starting proteins.

The gelling concentrations were determined for these proteins. The Arise 5000 by itself did not gel, whereas the EX-38 gelled at 12% solids and the combined protein processed at acidic pH gelled at 16% solids.

Additional products were made by using varying percentages of the wheat and soy starting proteins. Some specific tests with Arise 5000 and EX-38 in the ratios of 80:20, 60:40, 50:50, 40:60 and 20:80 w/w were conducted. It was generally found that the final combined protein had more properties of the high concentration initial protein, though it was not true for all kind of proteins.

Additional products were made using 10%, 12.5%, and 15% w/w mixtures, and gave similar results.

Example 2

In this example combined proteins were prepared using wheat protein isolate (Arise 5000, MGP Ingredients, Inc.), blended with soy protein concentrate (Procon 2000, Solae Co.) at a 50:50 and 60:40 w/w ratio. The initial proteins were mixed in water to give 5% w/w slurry, and the liquid mixtures were then processed by homogenization with pH alteration, jet-cooking and holding, as described in Example 1.

The solubility of the initial proteins and the combined proteins were comparatively tested. The N solubility (between pH 6.5 and 7.5) of the Arise 5000 was about 5% to 3% and that of Procon 2000 was 1% to 1.2%. The values for the combined hybrid proteins processed at acidic pH were between 17% to 22%. In this case, a significant increase in the solubility of the combined protein was observed when compared with both the initial proteins. This clearly shows the synergistic effect of the process disclosed in this invention.

Additional products were made using 10%, 12.5%, and 15% w/w mixtures, and gave similar results.

Example 3

In this example combined proteins were prepared using wheat protein isolate (Arise 5000, MGP Ingredients, Inc.), blended with soy protein isolate (Supro 516, Solae Co.) at a 50:50 w/w ratio. The initial proteins were mixed in water to give 5% w/w slurry, and the liquid mixtures were then processed by homogenization with pH alteration, jet-cooking and holding, as described in Example 1.

The solubility of the initial proteins and the combined proteins were tested. The N solubility (between pH 6.5 and 7.5) of the Arise 5000 was about 5% to 3% and that of Supro 516 was 13% to 21%. And the values for combined proteins of the two processed at acidic pH were between 10.7% to 12% and the ones processed under basic pH were 18% to 22%. This again shows the synergistic effect of the present process.

It was observed that the emulsification capacity (EC) of the combined protein was significantly altered. The Supro 516 protein by itself, took about 145 ml oil to break the emulsion and Arise 5000 by itself took about 183 ml oil to break the emulsion, while the combined protein processed at basic pH took about 154 ml of oil to break the emulsion. In these emulsion experiments, the Arise 5000 was tested at acidic pH, while all other proteins were tested at neutral pH.

The gelling concentrations were determined for these proteins. The Arise 5000 by itself did not gel, while the Supro 516 gelled at 12% solids, and the combined protein processed at basic pH gelled at 16% solids.

Example 4

In this example combined proteins were prepared using wheat protein isolate (Arise 5000, MOP Ingredients, Inc.), blended with whey protein concentrate (IsoChill 9000 from Trega Foods) at a 50:50 w/w ratio. The initial proteins were mixed in water to give 5% w/w slurry, and the liquid mixtures were then processed by homogenization with pH alteration, jet-cooking and holding, as described in Example 1.

It was observed that the emulsification capacity (EC) of the combined protein changed significantly. The IsoChill 9000 protein by itself took 168 ml oil to break and Arise 5000 (tested at acidic pH) by itself took about 183 ml oil to break the emulsion, while the combined protein processed at basic pH took about 150 ml oil to break the emulsion.

The solubility of the initial proteins and the combined proteins were tested. The N solubility (between pH 6.5 and 7.5) of the Arise 5000 was about 5% to 3% and that of IsoChill 9000 was 56% to 58%. And the values for combined proteins of the two processed at acidic pH were between 13% to 15% and the ones processed under basic pH were 33% to 35%. This again shows the synergistic effect of the process disclosed in this invention.

The processed protein products of the invention can be selected to achieve desired functional properties, i.e., they have physiochemical properties which behave appropriately in food systems during preparation, processing, storage and consumption, and contribute to the quality and sensory attributes of food systems. Thus, while wheat protein isolate alone has very little or no solubility at neutral pH, a processed protein mixture in accordance with the invention has excellent water solubility and good emulsion characteristics. Moreover, the protein products of the invention can serve as a single source of many different amino acids. For example, wheat proteins are rich in cysteine, while soy proteins are rich in lysine. Thus, combined wheat protein/soy protein products can provide high levels of both cysteine and lysine.

The products of the invention can be used with meat products as an emulsifier to combine aqueous and lipid phases, thereby giving increased yields and better final product texture. The hybrid proteins may also be used in various kinds of high protein energy drinks to increase the water solubility of the proteinaceous ingredients, or as milk or caseinate replacers.

The gelling concentrations were determined for these proteins, and confirmed that Arise 5000 by itself did not gel, while the Isochill 9000 gelled at 8% solids and the combined protein processed at basic pH gelled at 10% solids.

Example 5

In this example, combined proteins were prepared using wheat protein isolate (Arise 5000) blended with soy protein isolates (EX-38 and Supro 516) and soy protein concentrate (Procon 2000) at 40:30:20: 10 w/w ratios. The initial proteins were mixed in water to give a 10% w/w slurry, and the liquid mixtures were then processed by homogenization with pH alteration, jet-cooking, and holding, as described in Example 1.

It was observed that the emulsification capacity of the combined protein changed significantly. Specifically, the EX-38, Supro 516, Procon 2000, and Arise 5000 proteins by themselves took 112, 145, 65, and 183 ml of oil, respectively, to break the emulsion, while the combined protein processed at basic pH took about 151 ml of oil for emulsion breaking. The Arise 5000 was tested at acidic pH and all other individual protein and the combined protein were tested at neutral pH. The solubility of the combined protein was increased as compared to that of Arise 5000, but was not higher than the initial soy protein isolates.

We claim:

1. A method of preparing hybrid proteins comprising the steps of:
    providing an aqueous, protein-containing slurry comprising at least two different proteins and having a solids content of from about 0.5-20% by weight;
    homogenizing said slurry at a homogenization temperature;
    introducing said homogenized slurry and steam into a pressurized injection zone, and treating said proteins therein under conditions of heat and pressure and for a time sufficient to alter the conformation of at least some of the proteins, said temperature condition within said injection zone being from about 225-350° F. and being substantially greater than said homogenization temperature, said pressure condition being from about 10-150 psi;

cooling the treated slurry to cause the formation of said hybrid proteins; and recovering hybrid proteins.

2. The method of claim 1, said proteins selected from the group consisting of plant and animal proteins.

3. The method of claim 2, said plant proteins selected from the group consisting of soy, wheat, oat, rice, peanut, pea, cotton seed, corn, sorghum, fruits, and mixtures thereof.

4. The method of claim 2, said animal proteins selected from the group consisting of beef, poultry, pork, milk, whey, eggs, and mixtures thereof.

5. The method of claim 1, including the step of adjusting the pH of said slurry so as to maximize the solubility of said at least two different proteins.

6. The method of claim 5, said pH being from about 2-4 or from about 7-9.

7. The method of claim 1, said slurry including one or more additional ingredients selected from the group consisting of sulfur-containing compounds, oxygen, alkali metal salts, alkaline earth metal salts, phosphates, C12-C22 fatty acids, polysaccharides, C1-C4 alcohols, and aromatic compounds.

8. The method of claim 1, including the step of introducing said homogenized slurry and steam into a jet cooker, said steam being pressurized and coming into direct contact with said slurry in said jet cooker.

9. The method of claim 1, said pressure being from about 60-135 psi.

10. The method of claim 1, including the step of retaining said proteins within said zone for an average time of from about 1 second to 2½ minutes.

11. The method of claim 1, said time being from about 1-125 seconds.

12. The method of claim 1, said different proteins being proteins of different species.

13. The method of claim 1, said different proteins being different intra-species proteins.

14. The method of claim 1, including the step of cooling said treated slurry to a temperature of from about 50-150° F.

15. The method of claim 14, said temperature being from about 75-125° F.

16. The method of claim 1, said cooling step being carried out over a period of from about 10-60 seconds.

17. The method of claim 16, said period being from about 15-40 seconds.

18. The method of claim 1, said recovery step comprising the step of drying the treated slurry to obtain said hybrid proteins.

19. The method of claim 18, said drying step comprising spray drying or any other moisture removal method.

20. The method of claim 1, said recovered hybrid proteins having a moisture content of from about 3-10% by weight, wet basis.

21. The method of claim 20, said moisture content being from about 4-7% by weight, wet basis.

22. The method of claim 1, including the step of adjusting the pH of said slurry prior to or during said homogenizing step.

23. The method of claim 22, including the step of adding a pH-adjusting agent to said slurry during said homogenizing step.

24. The method of claim 1, wherein said slurry contains more than two different proteins.

25. The method of claim 1, at least one of said proteins being modified by a process selected from the group consisting of chemical, enzymatic, or thermo-mechanical processes prior to the formation of said slurry.

26. The method of claim 1, said homogenization temperature being essentially ambient.

27. A method of preparing hybrid proteins comprising the steps of:

providing an aqueous, protein-containing slurry comprising at least two different proteins and having a solids content of up to about 50% by weight;

homogenizing said slurry;

introducing said homogenized slurry and steam into a pressurized injection zone, and treating said proteins therein under conditions of heat and pressure and for a time sufficient to alter the conformation of at least some of the proteins;

cooling said treated slurry over a period of from about 10-60 seconds to cause the formation of said hybrid proteins; and recovering hybrid proteins.

28. A method of preparing hybrid proteins comprising the steps of:

providing an aqueous, protein-containing slurry comprising at least two different proteins and having a solids content of up to about 50% by weight, at least one of said proteins being modified by a process selected from the group consisting of chemical, enzymatic, or thermo-mechanical processes prior to the formation of said slurry;

homogenizing said slurry;

introducing said homogenized slurry and steam into a pressurized injection zone, and treating said proteins therein under conditions of heat and pressure and for a time sufficient to alter the conformation of at least some of the proteins;

cooling the treated slurry to cause the formation of said hybrid proteins; and recovering hybrid proteins.

* * * * *